(12) United States Patent
Whitmyer, Jr.

(10) Patent No.: US 8,972,430 B2
(45) Date of Patent: Mar. 3, 2015

(54) RECORD PROTECTION SYSTEM FOR NETWORKED DATABASES

(71) Applicant: Wesley W. Whitmyer, Jr., Stamford, CT (US)

(72) Inventor: Wesley W. Whitmyer, Jr., Stamford, CT (US)

(73) Assignee: WhitServe LLC, Stamford, CT (US)

( * ) Notice: Subject to any disclaimer, the term of this patent is extended or adjusted under 35 U.S.C. 154(b) by 0 days.

(21) Appl. No.: 14/192,539

(22) Filed: Feb. 27, 2014

(65) Prior Publication Data

US 2014/0181060 A1    Jun. 26, 2014

Related U.S. Application Data

(63) Continuation of application No. 11/334,246, filed on Jan. 18, 2006, now abandoned.

(51) Int. Cl.
*G06F 17/30* (2006.01)

(52) U.S. Cl.
CPC .... *G06F 17/30362* (2013.01); *G06F 17/30386* (2013.01); *G06F 17/30371* (2013.01)
USPC ........................................................ 707/758

(58) Field of Classification Search
CPC . G06F 17/243; G06F 17/30; G06F 17/30286; G06F 17/30386
USPC ........................................................ 707/758
See application file for complete search history.

(56) References Cited

U.S. PATENT DOCUMENTS

| | | | |
|---|---|---|---|
| 5,495,565 A | 2/1996 | Millard et al. | |
| 5,838,918 A | 11/1998 | Prager et al. | |
| 6,687,709 B2 | 2/2004 | Williams | |
| 6,772,155 B1 | 8/2004 | Stegelmann | |
| 6,820,075 B2 | 11/2004 | Shanahan et al. | |
| 2002/0194205 A1 | 12/2002 | Brown et al. | |
| 2005/0198563 A1* | 9/2005 | Kristjansson | 715/507 |
| 2005/0209883 A1* | 9/2005 | Fletcher-Haynes et al. | 705/2 |
| 2005/0257134 A1* | 11/2005 | Goodman et al. | 715/507 |
| 2006/0026145 A1* | 2/2006 | Beringer et al. | 707/3 |
| 2006/0074867 A1* | 4/2006 | Breitzman | 707/3 |
| 2006/0116913 A1 | 6/2006 | Hansan et al. | |
| 2007/0003919 A1* | 1/2007 | Stevenson et al. | 434/350 |

* cited by examiner

*Primary Examiner* — Jensen Hu
(74) *Attorney, Agent, or Firm* — St. Onge Steward Johnston & Reens LLC

(57) ABSTRACT

A record protection system for a networked database is provided. The system includes a client, a host processor accessible by the client via a telecommunications network, a database accessible by the host processor and containing at least one data record, software executing on the host processor for receiving data from the client for one or more fields of the data record, software executing on the processor for receiving data from a source, software executing on the host processor for comparing the data received from the client to the data received from the source, and software executing on the host processor to prevent editing of the data record by the client if the at least a portion of the data received from the client matches the data received from the source.

20 Claims, 3 Drawing Sheets

RECORD PROTECTION SYSTEM FOR NETWORKED DATABASES

FIELD OF THE INVENTION

The invention relates to network-based data processing and storage, and more particularly to a system and method for protecting data records in Internet-based databases.

BACKGROUND OF THE INVENTION

Internet-based application service providers, so-called "ASPs" are known and provide the advantage that hardware and software maintenance and upgrades are centrally managed by a third party. The ASP model has been further extended to include web-hosted databases. For example, an ASP may provide a client with a backup database for duplicate storage of client data records. Further, an ASP or any other host may maintain a client's active database, and/or sensitive data therein, and allow the client to remotely store and edit data records to the database via the Internet. Thus, a client/user may log in to his web-hosted database via a web browser on his LAN/computer and create or manipulate data records in real time.

However, one difficulty faced when one or more users of a particular client are accessing a web-hosted database is preventing errors in the creation of new data records and in edits to existing data records. The problem is further complicated when the completion of a particular field of a data record triggers the storage and/or edit of related data in the data record. For example, a user may have automatic permissions to enter and edit data in the web-hosted database. Upon completing a particular field of a data record, additional fields of the data record may be automatically populated based on the entered data. There is then a risk that the user or another user having edit permissions may accidentally or erroneously edit the particular field and/or the automatically generated data.

What is desired, therefore, is a system and method for locking data records in networked or web-hosted databases. Further desired is a system and method for locking a data record upon the occurrence of specified trigger.

SUMMARY OF THE INVENTION

According, it is an object of the present invention to provide a system and method for automatically locking a data record in a networked database upon the completion of a verification step.

It is a further object of the present invention to provide the system and method wherein the lock may be reversed or modified by a host or client administrator.

These and other objectives are achieved by providing a record protection system for a networked database, including a client, a host processor accessible by said client via the Internet, a database accessible by said host processor and containing at least one data record, software executing on said host processor for receiving data from said client for one or more fields of the data record, software executing on said processor for receiving data from a source, software executing on said host processor for comparing the data received from said client to the data received from the source, and software executing on said host processor to prevent editing of the data record by said client if at least a portion of the data received from said client matches the data received from the source.

Further provided is a method for protecting data records in a networked database, including the steps of receiving data from a client via a telecommunications network for one or more fields of a data record, determining whether at least a portion of the data matches data received from a source, storing matched data in the data record, and locking the data record to prevent future editing by the client.

DETAILED DESCRIPTION OF THE INVENTION

Figure 1:
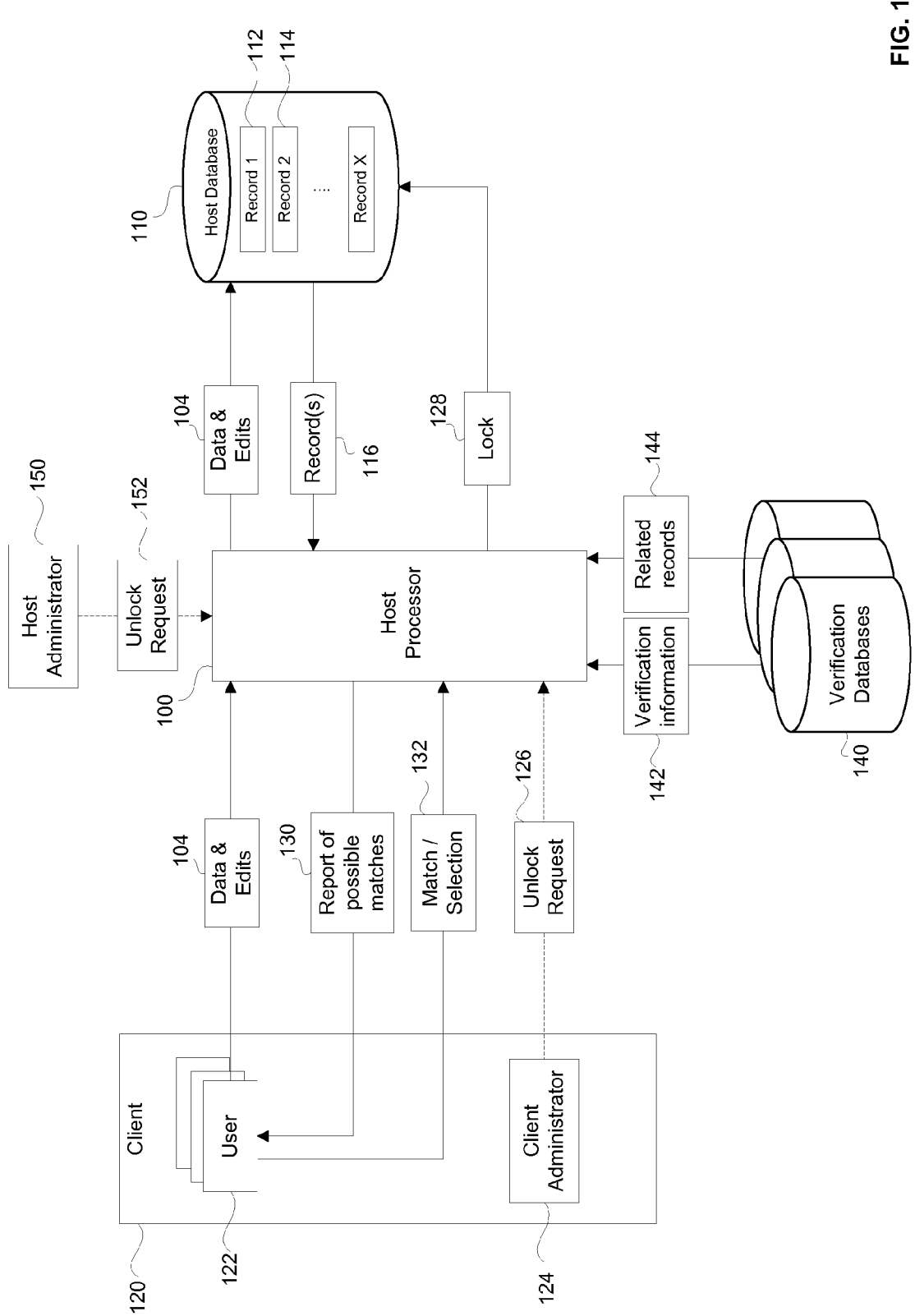
FIG. 1 is a schematic diagram of a record protection system for a networked database according to the present invention.

FIG. 1 shows a schematic diagram of a record protection system according the present invention. The system includes a host processor 100. The host processor 100 may be any processor, controller or server for executing one or more software applications. The host processor 100 may be in communication with any number of databases, such as the database 110. The database 110 includes a plurality of data records, e.g., data record 112 and data record 114.

The host processor 100 further includes software for receiving data and edits 104 for storage in the database 110. The data 104 may be received from a client 120, or any number of users 122 associated with the client 120, via a communications network (not shown). The communications network may be any network, such as the Internet or an Intranet. In a preferred embodiment, a user 122 remotely accesses the database 110 via a web interface on a client computer.

As shown, the host processor 100 receives data 104 from the client 120 and/or any user 122. The data 104 may be data for initiating the creation of a new data record or proposed edits to an existing data record (e.g., 112). In one embodiment, the host (i.e., host processor 100 and host database 110) may be a provider of a service for maintaining U.S. patents (e.g., paying patent maintenance fees) for any number of clients 120. Therefore, the host processor 100 may receive data related to new patents for which maintenance is desired (e.g., identified by verification information 142 or data records in a verification database 140) or updates and/or edits to an existing patent data record stored in the host database 110. As one of ordinary skill in the art will understand, the host has an interest in the client 120 being able to input its own data to save the time and labor required to populate the database 110. However, the host must ensure that the correct patent is identified and further that no user 122 of the client 120 erroneously enters data identifying an incorrect patent. Failure to ensure the accuracy of entered data may lead to the host failing to pay a maintenance fee or paying a maintenance fee on the wrong patent.

The system further includes any number of verification databases 140 (e.g., or sources). The verification databases 140 may include verification information 142 and/or data records to verify the data and edits 104 provided by the client 120. In some embodiments, the verification databases 140 include information related to any number of potential data records to be created in the host database 110. For example, if the database 110 includes data records of patents owned by one or more clients, one of the verification databases 140 may include information related to substantially all U.S. and/or foreign patents and patent applications. For example, the verification databases 140 may include the United States Patent and Trademark database, the European Patent Office database, etc. Therefore, when a client 120 attempts to create a new data record regarding a patent, the host processor 100 may query the verification databases 140 and attempt to verify and/or match at least a portion of the received data and edits 104 with verification information 142 retrieved from the verification databases 140 prior to creating or storing the new data record.

Upon receipt of data and edits 104, the host processor 100 may initiate the creation of a new data record in the host database 110. The host processor 100 may then query the verification databases 140 (discussed below) to determine possible matches to the received data 104. For example, in the practice of maintaining of patent data records, the client 120 may provide a patent number, a filing date, and/or issue data of a U.S. patent. The host processor 100 may then identify one or more data records (e.g., relating to patents) in the verification databases 140 corresponding to this received data. In some embodiments, the host processor 100 may also identify and/or access any number of existing data records 116 in the host database 110 identified by the data and edits 104. For example, if a client 120 enters data corresponding to an existing data record, the system may prompt the client 120 (e.g., via a web interface) to determine whether the client 120 is either attempting to edit the existing data record 116 or erroneously attempting to create a duplicate data record.

As shown in FIG. 1, the system includes a software means 128 for locking one or more data records. For example, the host processor 100 may lock a particular data record to prevent any further edits to the data record, e.g., following a verification step or matching of data. In some embodiments, the verification step or verification may require that a user 122 first complete a particular field and/or a set number of fields of data. For example, the user 122 may complete data fields for a particular data record via the web interface. The host processor 100 may require at least three separate identifying pieces of data to be entered prior to updating or creating the data record. Once each of the particular number of required data fields are verified and/or matched to a single data record and/or set of verification information 142 in the verification databases 140, the data is stored in the host database 110 and the corresponding data record(s) locked. In some embodiments, the system may allow the user 122 to continue to complete any number of data fields until at least a predetermined number of the data fields match or identify the same verification information 142. The predetermined amount may be based on a data sensitivity factor, a fixed number of data fields, and/or a host or client preference.

In some embodiments, data entered by a user 122 via a web interface may be stored in temporary storage of the system prior to the data is being verified. For example, a user 122 may enter data and edits 104 with the appearance of the data being stored or added to a particular data record (e.g., 112). However, the system may store the data (and lock the record) only after the entered data is verified.

In a preferred embodiment, a locked data record may only be edited if unlocked by an administrator, e.g., via the transmission of an unlock request 126/152. The administrator may be a client administrator 124 or host administrator 150, shown in FIG. 1. If a data record is unlocked, additional data and edits may be received. Otherwise, the data record may remain locked.

If the data and edits 104 provided by the user 122 are identifiable to more than one set of verification information 142 or existing data record, the host processor 100 may provide the client 120 (or user 122) with a report of possible matches 130 (e.g., prompt, display, email, etc). For example, the user 122 may enter a correct patent filing date but an incorrect patent number. Based on the data entered and stored client data/preferences, the system may query any number of databases (e.g., verification databases 140 and/or host database 110) to determine potential sets of verification information 142 (e.g., patents) or existing data records to which the user 122 is referring. For example, knowing the filing date and assignee (e.g., the client), the host processor 100 may be able to determine one or two potential patents filed on that day matching some of the entered data. The host processor 100 may then prompt the user 122 via the web interface to select the intended information or record from a list of possible matches. Upon the user 122's selection 132, the data record may be locked.

The verification databases 140 shown in FIG. 1 may further include information to supplement the data and edits 104 of a newly created or existing data record. Upon a user 122 providing a minimum amount of data to verify the data and identify a particular U.S. (or foreign) patent, the host processor 100 may query the verification databases 140 and retrieve the remaining data necessary to create the new data record and/or related records 144 to supplement the data 104 provided by the user 122. For example, should the user 122 provide a patent number and filing date identifying a particular patent, the host processor 100 may lock the data record and access the verification databases 140 to determine an issue date and/or schedule of maintenance fee due dates. Further, the host processor 100 may identify all related patents (e.g., parent applications, continuations, divisionals, foreign filings, etc). The host processor 100 may then prompt or generate a report 130 to ask the user 122 if they wish to create data records for the related patents. The system may further link the related data records.

Figure 2:
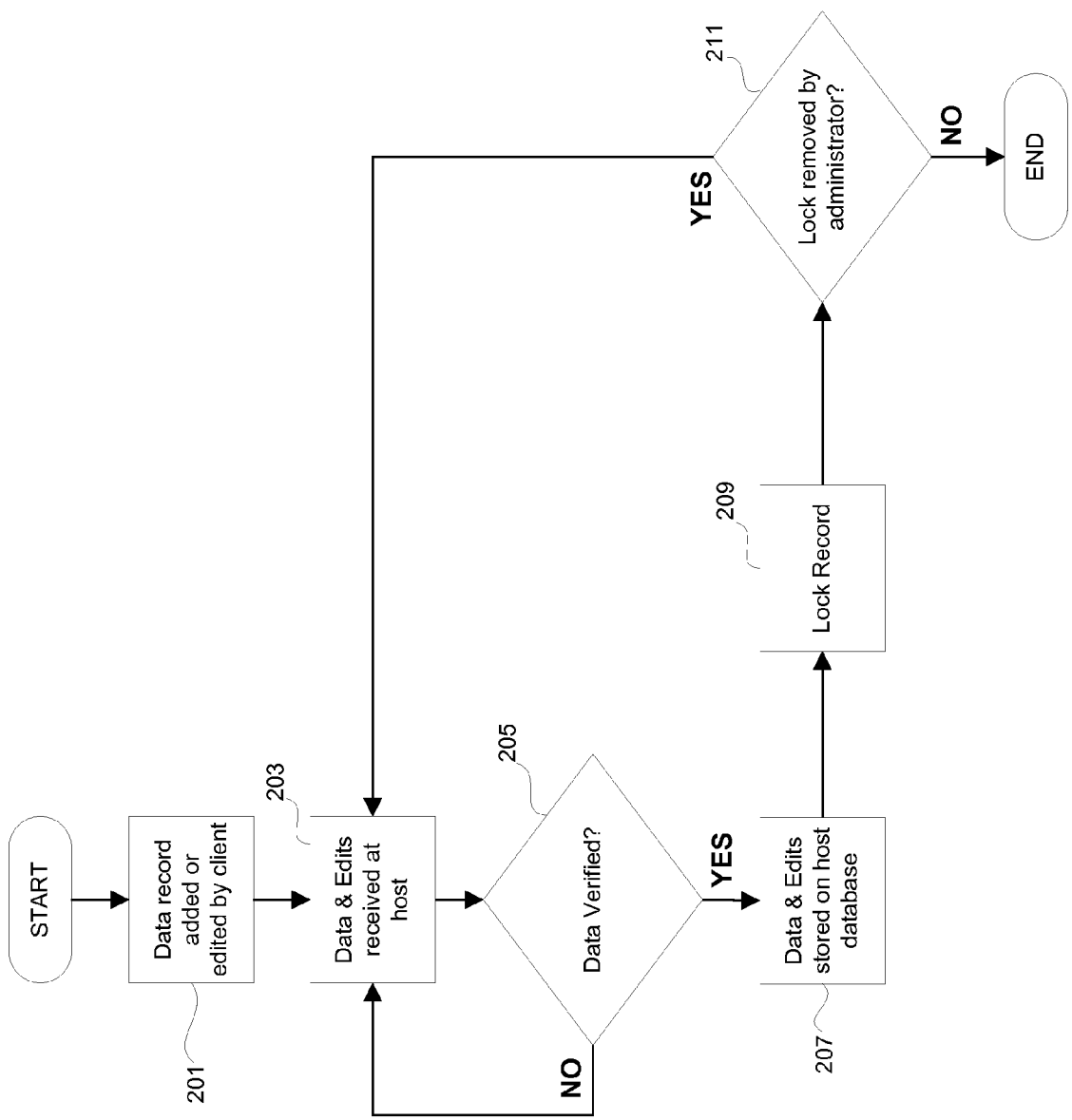
FIG. 2 is a method of protecting data records in a networked database employable by the system shown in FIG. 1.

FIG. 2 shows a schematic diagram of a method for protecting a data record in a networked database according to the present invention. The method is described with respect to the system show in FIG. 1. However, one of ordinary skill in the art will understand that the method may be implemented in other systems and devices. The method includes a first step 201 of providing data to add (or edit) a data record by a client and/or user. For example, a user 122 may provide data 104 to input fields via a web interface to create a new data record. As discussed above, in some embodiments the user 122 may be given the appearance of creating or editing a data record via the web interface, however the data record may not be edited until the verification step is completed. Data and edits 104 provided by the user/client are next received by the host processor (step 203).

Following (or during) the receipt of data from the user, the host processor 100 attempts to verify or match the data (step 205). In some embodiments, the host processor 100 may require that a predetermined number of data fields be completed by the user. The host processor 100 may then query verification databases 140 (and/or database 110) to verify the data in the data fields. If the data is verified (e.g., matched to a particular set of verification information 142 or record), the data and edits may be stored in the host database (step 207). The data record is then locked to prevent further edits (step 209). As discussed above, the host processor 100 may then automatically populate additional data fields of the data record based on the verified data or create additional related data records.

Figure 3:
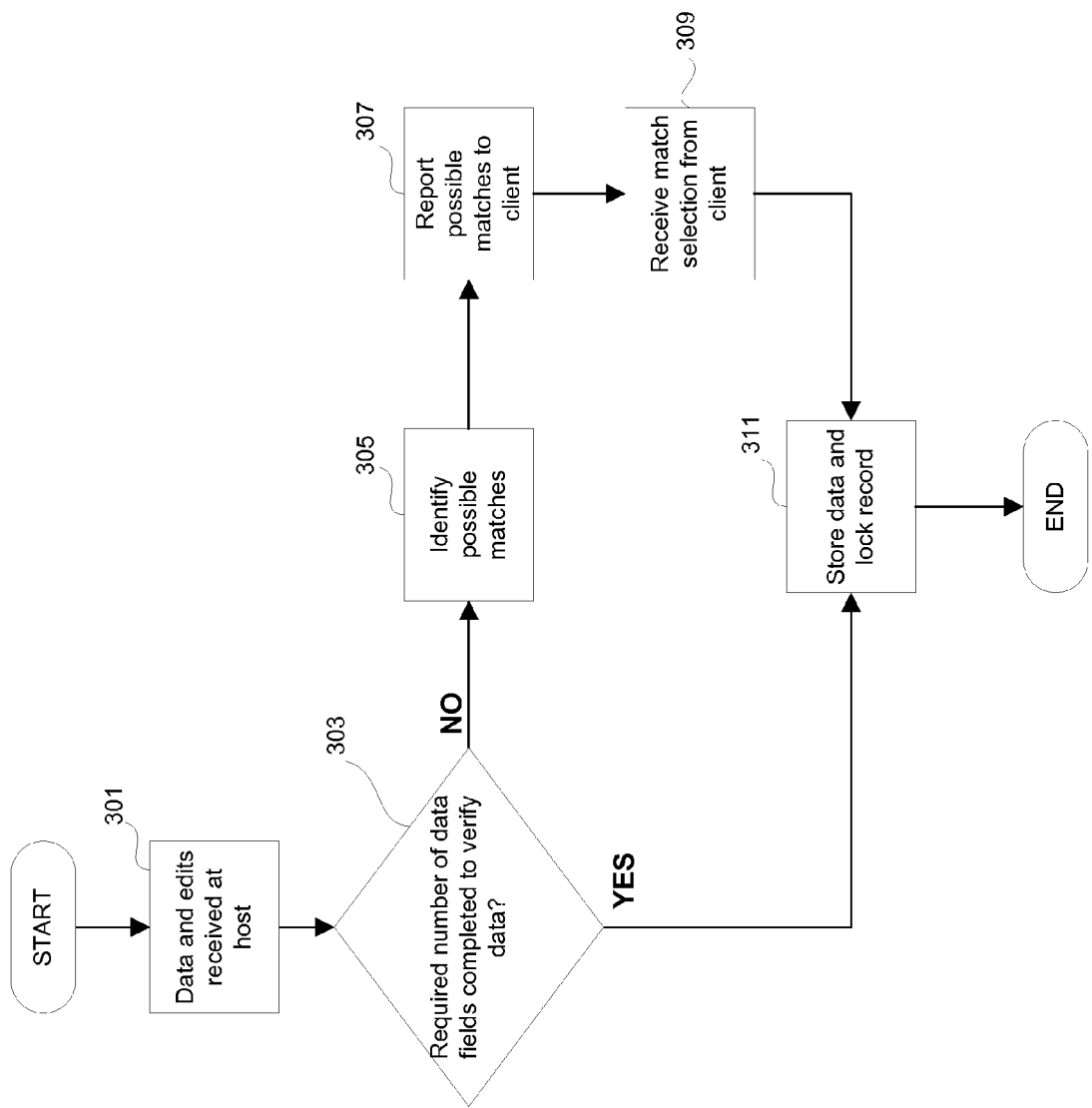
FIG. 3 is a method of protecting data records in a networked database employable by the system shown in FIG. 1.

FIG. 3 shows a method of creating or editing a data record in a networked database employable by the system shown in FIG. 1. In a first step, data and/or edits are received by the host (e.g., from a client and/or client computer). The client may, for example, enter data to several data fields via a web interface. It is contemplated that some of the data may be incorrect and/or in an improper form. Therefore, the system may require that a predetermined number of data fields be filled out prior to identifying the single data record to which it pertains. If the data entered in the data fields is sufficient to match the data to a single set of verification information (or data record) from a source or database (step 303), the data may be stored and the record locked (step 311). If the data provided by the client is insufficient to identify a single record, the system may identify possible matches and report the possible matches to the client (step 305-307). The client may then select the one record to which it was referring (step 309) and the data may be stored in the appropriate data record.

Advantages of the present invention include the provision of a system and method to maintain sensitive data records for a client while minimizing the risk of an employee of the client accidentally modifying the data. The present invention allows a client to perform their own data entry while ensuring that the data is accurate. The present invention is particularly useful for an entity providing the service of paying patent maintenance fees on behalf of a plurality of clients.

Although the invention has been described with reference to a particular arrangement of parts, features, and the like, these are not intended to exhaust all possible arrangements or features, and indeed many modifications and variations will be ascertainable to those of skill in the art.

What is claimed is:

1. A record protection system for a networked database, comprising:
   a host processor;
   a database accessible by said host processor including a plurality of data records, each data record associated with a client;
   a web interface presented to a client via the Internet for creation of a data record in said database, the web interface including a plurality of input fields each corresponding to a field of the data record;
   software executing on said host processor for receiving data from the client via the web interface into two or more of the input fields;
   software executing on said host processor for receiving data from a verification source;
   software executing on said host processor for comparing the data received from the client to the data received from the verification source; and
   software executing on said host processor storing the data record in said database and locking the entire data record and the plurality of input fields, such that no portion of the data record can be edited by the client, once the data received in a predetermined number of the input fields matches the data received from the verification source.

2. The system according to claim 1, wherein said software for comparing the data compares the data in real time as the data is entered into the plurality of input fields by the client.

3. The system according to claim 1, wherein said software for comparing the data compares the data after the completion of a set number of the plurality of input fields.

4. The system according to claim 1, wherein at least one of the data received from said client and the data received from the verification source is intellectual property data.

5. The system according to claim 4, wherein the verification source is a patent office database.

6. The system according to claim 5, wherein a match exists when the data received in the predetermined number of the input fields matches data received from a single data record of the verification source, the single data record identifying a single patent.

7. The system according to claim 1, further comprising:
   software executing on said host processor automatically retrieving supplemental data corresponding to the data received from the client that matches the data received from the source and storing the supplemental data in the data record in said database.

8. The system according to claim 7, wherein the supplemental data is retrieved from the verification source.

9. The system according to claim 1, further comprising:
   software executing on the host processor for generating a report.

10. The system according to claim 9, wherein the report includes an inquiry generated if the data received from the client does not match the data received from the verification source.

11. The system according to claim 9, wherein the report includes one or more potential matches for selection by the client.

12. The system according to claim 11, wherein said software to lock the data record locks the data record upon receipt of a match selection from the client.

13. The system according to claim 9, wherein the report includes one or more suggested additions to matched data.

14. The system according to claim 1, further comprising:
   software executing on the host processor for receiving an unlock command from an administrator indicative of permitting editing of the data record.

15. A method for protecting data records in a networked database, comprising the steps of:
   presenting a web interface to a client via the Internet for creation of a data record in a database, the web interface including a plurality of input fields each corresponding to a field of the data record;
   receiving data from the client via the web interface into two or more of the input fields;
   comparing, via software executing on a processor, the data received from the client to data received from a verification source; and
   storing the data record in the database and locking the entire data record and the plurality of input fields via software executing on the processor, such that no portion of the data record can be edited by the client, once the data received in a predetermined number of the input fields matches the data received from the verification source.

16. The method according to claim 15, further comprising the steps of:
   generating a report; and
   presenting the report to the client via the web interface, wherein the report includes one or more possible matches to the data received from the client.

17. The method according to claim 16, wherein the report includes a suggested addition to the data record.

18. The method according to claim 15, further comprising the steps of:
   retrieving supplemental data corresponding to the data received from the client; and
   storing the supplemental data in at least one other field of the data record.

19. The method according to claim 15, wherein the verification source is a patent office database, wherein a match exists when the data received in the predetermined number of the input fields matches data received from a single data record of the verification source, the single data record identifying a single patent.

20. A record protection system for a networked database, comprising:

a host processor;

a database accessible by said host processor including a plurality of data records, each data record associated with a client;

a web interface presented to a client via the Internet for creation of a data record in said database, the web interface including a plurality of input fields each corresponding to a field of the data record;

software executing on said host processor for receiving intellectual property data from the client via the web interface into two or more of the input fields;

software executing on said host processor for receiving intellectual property data from a patent and trademark database;

software executing on said host processor for comparing the intellectual property data received from the client to the intellectual property data received from the patent and trademark database, wherein comparison is performed in real time as the intellectual property data is entered into the plurality of input fields by the client;

software executing on said host processor storing the data record in said database and locking the entire data record and the plurality of input fields, such that no portion of the data record can be edited by the client, once the intellectual property data received in a predetermined number of the input fields matches the intellectual property data received from a single data record of the patent and trademark database; and software executing on said host processor automatically retrieving supplemental data corresponding to the data received from the client that matches the data received from the source and storing the supplemental data in the data record in said database.

* * * * *